(12) United States Patent
Nakahara (10) Patent No.: US 11,570,360 B2
(45) Date of Patent: Jan. 31, 2023

(54) IMAGE CAPTURING DEVICE, IMAGE CAPTURING METHOD AND RECORDING MEDIUM

(71) Applicant: CASIO COMPUTER CO., LTD., Tokyo (JP)

(72) Inventor: Shota Nakahara, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/746,050

(22) Filed: May 17, 2022

(65) Prior Publication Data

US 2022/0279122 A1    Sep. 1, 2022

Related U.S. Application Data

(63) Continuation of application No. 16/810,140, filed on Mar. 5, 2020, now Pat. No. 11,368,618.

(30) Foreign Application Priority Data

Mar. 20, 2019    (JP) .............................. JP2019-052245

(51) Int. Cl.
*H04N 5/232*    (2006.01)

(52) U.S. Cl.
CPC ..... *H04N 5/23245* (2013.01); *H04N 5/23258* (2013.01); *H04N 5/23274* (2013.01); *H04N 5/232411* (2018.08); *G06T 2207/30088* (2013.01)

(58) Field of Classification Search
CPC ......... H04N 5/23245; H04N 5/232411; H04N 5/23258; G06T 2207/30088
See application file for complete search history.

(56) References Cited

U.S. PATENT DOCUMENTS

| | | |
|---|---|---|
| 5,873,830 A | 2/1999 | Hossack et al. |
| 6,709,387 B1 | 3/2004 | Glukhovsky et al. |
| 7,501,610 B2 | 3/2009 | Nakao et al. |
| 7,542,074 B2 | 6/2009 | Sakurai et al. |
| 10,136,059 B2 | 11/2018 | Kinoshita |
| 10,735,650 B2 | 8/2020 | Kinoshita |
| 10,812,714 B2 | 10/2020 | Ayalasomayajula et al. |

(Continued)

FOREIGN PATENT DOCUMENTS

| | | |
|---|---|---|
| CN | 102065195 A | 5/2011 |
| CN | 105637856 A | 6/2016 |

(Continued)

OTHER PUBLICATIONS

Chinese Office Action (and English language translation thereof) dated Apr. 2, 2021, issued in counterpart Chinese Application No. 202010164018.0.

(Continued)

*Primary Examiner* — John Villecco
(74) *Attorney, Agent, or Firm* — Holtz, Holtz & Volek PC (57) ABSTRACT

An image capturing device includes a housing and a processor. The processor is configured to determine whether a state of movement of the housing relative to an observation target is either a first state or a second state, and perform a control based on the state of the movement of the housing to cause change in electric energy for drive of the image capturing device.

4 Claims, 8 Drawing Sheets

(56) References Cited

U.S. PATENT DOCUMENTS

| | | | |
|---|---|---|---|
| 10,986,985 | B2 | 4/2021 | Godo |
| 11,153,488 | B2 | 10/2021 | Antesberger et al. |
| 11,368,618 | B2 * | 6/2022 | Nakahara ......... H04N 5/232411 |
| 2005/0047775 | A1 | 3/2005 | Sakurai et al. |
| 2007/0153692 | A1 | 7/2007 | Song et al. |
| 2008/0242926 | A1 | 10/2008 | Nishino |
| 2011/0109937 | A1 | 5/2011 | Daisuke et al. |
| 2013/0019685 | A1 | 1/2013 | Sakaguchi et al. |
| 2013/0053697 | A1 | 2/2013 | Holl et al. |
| 2015/0133786 | A1 | 5/2015 | Wong et al. |
| 2015/0350506 | A1 | 12/2015 | Olsson et al. |
| 2016/0249886 | A1 | 9/2016 | Sakaguchi et al. |
| 2017/0223271 | A1 | 8/2017 | Holz |
| 2017/0303899 | A1 | 10/2017 | Willsie |
| 2019/0282213 | A1 | 9/2019 | Cheung et al. |
| 2020/0322533 | A1 | 10/2020 | Kinoshita |
| 2020/0351466 | A1 | 11/2020 | Donsbach et al. |
| 2020/0358963 | A1 | 11/2020 | Manzari et al. |
| 2021/0152739 | A1 | 5/2021 | Lu et al. |

FOREIGN PATENT DOCUMENTS

| | | |
|---|---|---|
| JP | 2005079731 A | 3/2005 |
| JP | 2007025212 A | 2/2007 |
| JP | 2007116208 A | 5/2007 |
| JP | 2008172507 A | 7/2008 |
| JP | 2013022229 A | 2/2013 |
| JP | 2015127771 A | 7/2015 |
| JP | 2016042903 A * | 4/2016 |
| JP | 2018042139 A | 3/2018 |
| KR | 102117301 B1 * | 6/2020 |
| WO | 2017047112 A1 | 3/2017 |

OTHER PUBLICATIONS

Japanese Office Action dated May 21, 2021 (and English translation thereof) issued in Japanese Application No. 2019-052245.

Notice of Allowance dated Mar. 3, 2022, issued in parent U.S. Appl. No. 16/810,140.

Office Action (Non-Final Rejection) dated Nov. 16, 2021, issued in parent U.S. Appl. No. 16/810,140.

* cited by examiner

IMAGE CAPTURING DEVICE, IMAGE CAPTURING METHOD AND RECORDING MEDIUM

CROSS-REFERENCE TO RELATED APPLICATION

This application is a Continuation Application of U.S. application Ser. No. 16/810,140, filed on Mar. 5, 2020, which claims the benefit of Japanese Patent Application No. 2019-52245, filed on Mar. 20, 2019, the entire disclosures of all of which are incorporated by reference herein.

FIELD

The present disclosure relates to an image capturing device, an image capturing method, and a recording medium.

BACKGROUND

Many types of cosmetics for various skin types are on market. Consumers can select cosmetics suitable for their own skin types from many types of cosmetics. However, without knowledge of their own skin types, selecting the suitable cosmetics might be difficult. Thus some cosmetic shops use a device for skin type diagnosis to help provide cosmetics suitable for skin types.

Unexamined Japanese Patent Application Kokai Publication No. 2007-25212 describes a magnified image capturing device that captures an image by magnifying an image of a customer's skin, for example in a case of determining a cosmetic suitable for skin conditions of the customer. This magnified image capturing device switches an optical magnification between a low magnification and a high magnification by moving a lens included in imaging optics between a low-magnification observing position and a high-magnification observing position along an imaging optical axis.

SUMMARY

According to one aspect of the present disclosure, an image capturing device includes a housing; and a processor configured to determine whether a state of movement of the housing relative to an observation target is either a first state or a second state, and perform a control based on the state of the movement of the housing to cause change in electric energy for drive of the image capturing device.

BRIEF DESCRIPTION OF THE DRAWINGS

A more complete understanding of this application can be obtained when the following detailed description is considered in conjunction with the following drawings, in which.

DETAILED DESCRIPTION

An image capturing device according to embodiments of the present disclosure is described hereinafter with reference to the drawings.

Embodiment 1

Figure 1:
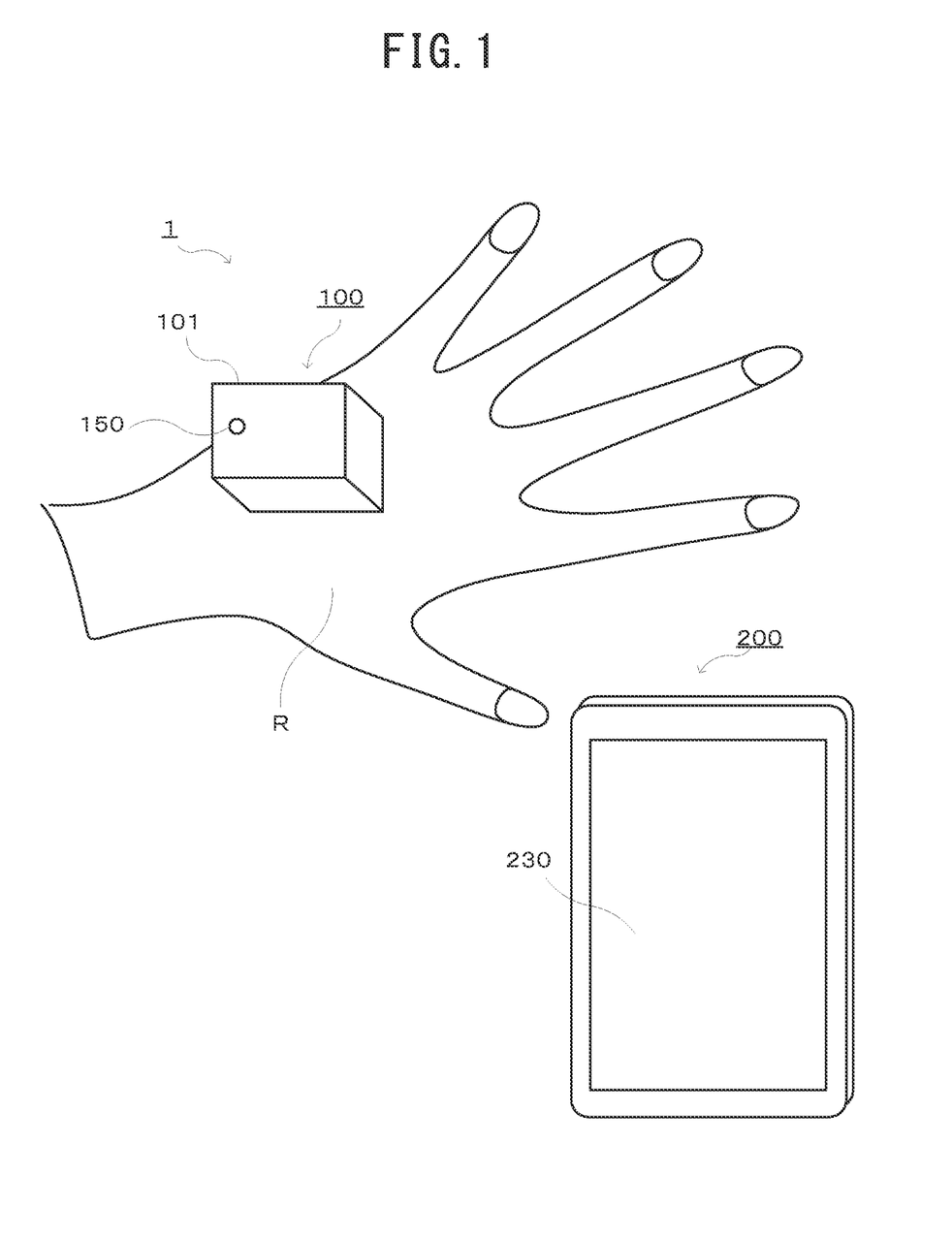
FIG. 1 is a drawing illustrating an image capturing device according to an Embodiment 1 of the present disclosure, and a terminal device.

As illustrated in FIG. 1, an image capturing device 100 according to the present embodiment captures an image by magnifying an image of an observation target R, such as a surface of skin, and transmits data indicating the captured image to a terminal device 200. Examples of the terminal device 200 include a smartphone and a tablet personal computer (PC), with a display 230, and the terminal device 200 displays the image transmitted by the image capturing device 100 on the display 230. The image capturing device 100 and the terminal device 200 are communicatively connected to each other via wiring connection or wireless connection. The image capturing device 100 and the terminal device 200 constitute an image capturing system 1.

Figure 2:
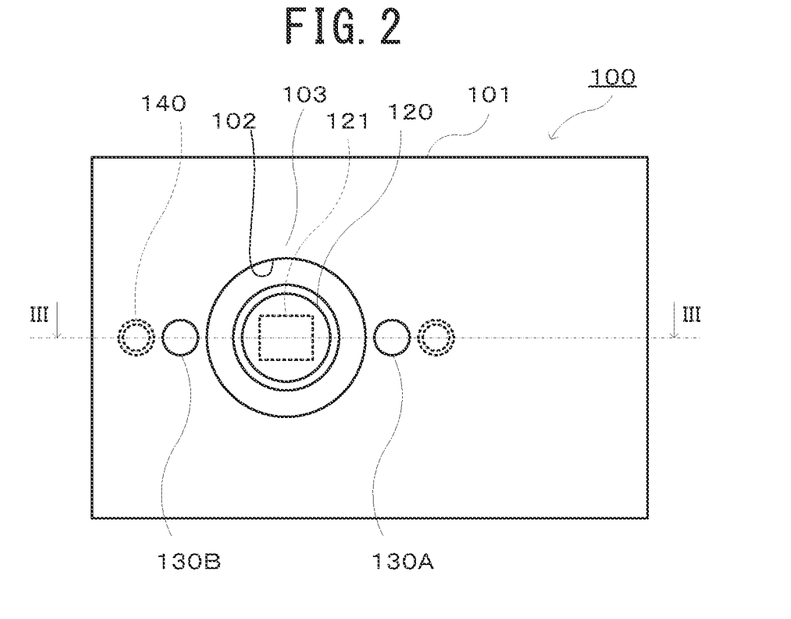
FIG. 2 is a drawing illustrating the image capturing device according to Embodiment 1 of the present disclosure.
Figure 3:
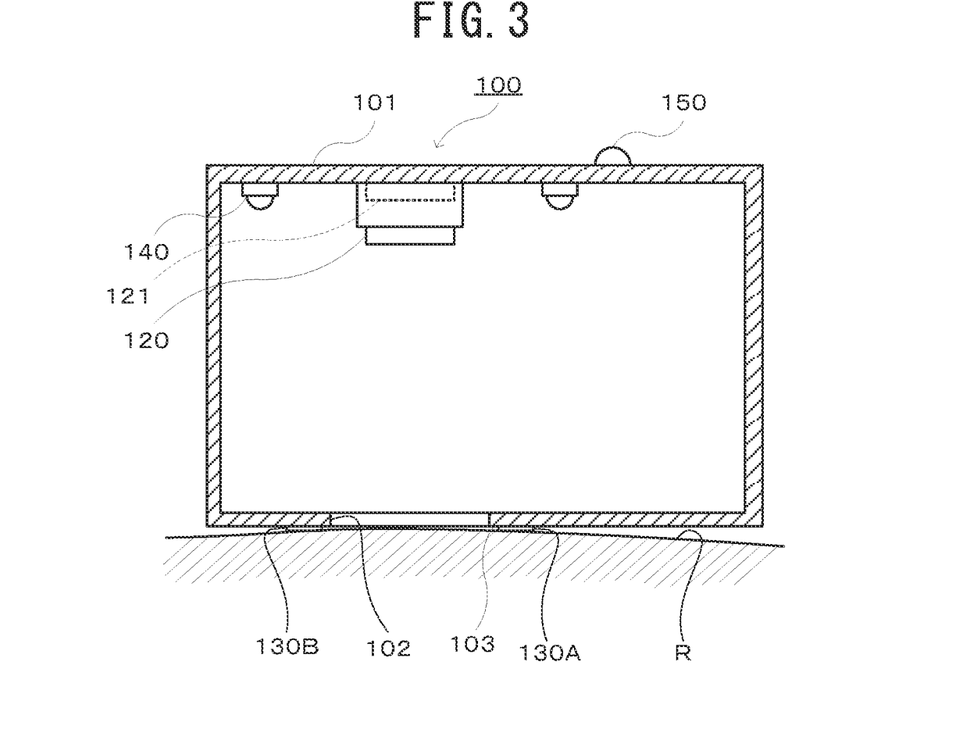
FIG. 3 is a cross-sectional view taken along line III-III.

As illustrated in FIGS. 2 and 3, the image capturing device 100 includes a housing 101, an image capturer 120, a first pressure sensor 130A and a second pressure sensor 130B, an illuminator 140, and an indicator 150.

The housing 101 has an observation hole 102 for observation of an observation target R, and contains the image capturer 120 and the illuminator 140. The observation hole 102 is an opening formed in the housing 101 so as to enable capturing of an image of the observation target R, with the image capturer 120 exposed to an exterior of the housing 101. A portion surrounding the observation hole 102 is referred to as an abutment 103. The abutment 103 is for keeping a constant distance between the image capturer 120 and the observation target R. With the abutment 103 of the housing 101 abutting against the observation target R, the distance between the image capturer 120 and the observation target is kept constant, and the image capturer 120 can capture an image of the observation target R through the observation hole 102. The observation hole 102 may be an opening, and may be provided with a transparent plate such as a glass plate or a transparent resin plate.

The image capturer 120 includes a lens, an image sensor such as a complementary metal oxide semiconductor (CMOS) image sensor or the like, and an image processor 121. The image capturer 120 captures an image of the observation target R through the observation hole 102, and outputs data indicating the captured image to a controller (processor) 110. The image capturer 120 is controlled by the controller 110 to set an image capturing mode to a first image capturing mode for capturing at a first frame rate or a second image capturing mode for capturing at a second frame rate that is lower than the first frame rate. The image processor 121 processes pre-process data acquired from the image sensor, and generates data indicating an image. For example, the first frame rate is 60 frames per second (fps) and the second frame rate is 30 fps. At the first frame rate, a readout time is reduced by sparse scanning, instead of reading of all pixels of the image sensor. Thus the image captured in the first image capturing mode has a resolution lower than that of the image captured in the second image capturing mode. For example, the number of pixels of the image captured in the first image capturing mode is 1 mega pixel (MP), and the number of pixels of the image captured in the second image capturing mode is 2 MP. Power supplied to the image capturer 120 is consumed by the image sensor, such as the CMOS image sensor, and the image processor 121. The amount of energy consumption is more affected by the frame rate than by the resolution. Thus the amount of energy consumption in the second image capturing mode at a lower frame rate is smaller than the amount of energy consumption in the first image capturing mode.

The first pressure sensor 130A and the second pressure sensor 130B are sensors for measuring a pressure in a well-known manner, such as a capacitance type or a strain gauge type of method. When the image capturing device 100 is placed on the observation target R, the first and second pressure sensors 130A and 130B detect a magnitude of pressure applied to the observation target R by the image capturing device 100, and converts the detected magnitude of pressure into an electrical signal. The first and second pressure sensors 130A and 130B thus function as a measurer for measuring an index indicating a strength at which the image capturing device 100 contacts the observation target R.

The first and second pressure sensors 130A and 130B are disposed facing each other with the observation hole 102 therebetween in a surrounding area of the observation hole 102. Disposing the first and second pressure sensors 130A and 130B in the surrounding area of the observation hole 102 enables precise measurement of the pressure applied to the area near the observation hole 102. In addition, disposing the first and second pressure sensors 130A and 130B facing each other with the observation hole 102 therebetween enables detection of misalignment, for example when the image capturing device is placed obliquely relative to the observation target R. This enables detection of whether the image capturing device 100 is properly placed on the observation target R.

The illuminator 140 includes a light emitting device such as a light emitting diode (LED), and irradiates the observation target R with light through the observation hole 102.

The indicator 150 is disposed in the housing 101, and notifies a user of the image capturing mode. The indicator 150 includes a light emitting device such as an LED. The indicator 150 emits light in yellow in the first image capturing mode, and emits light in green in the second image capturing mode.

Figure 4:
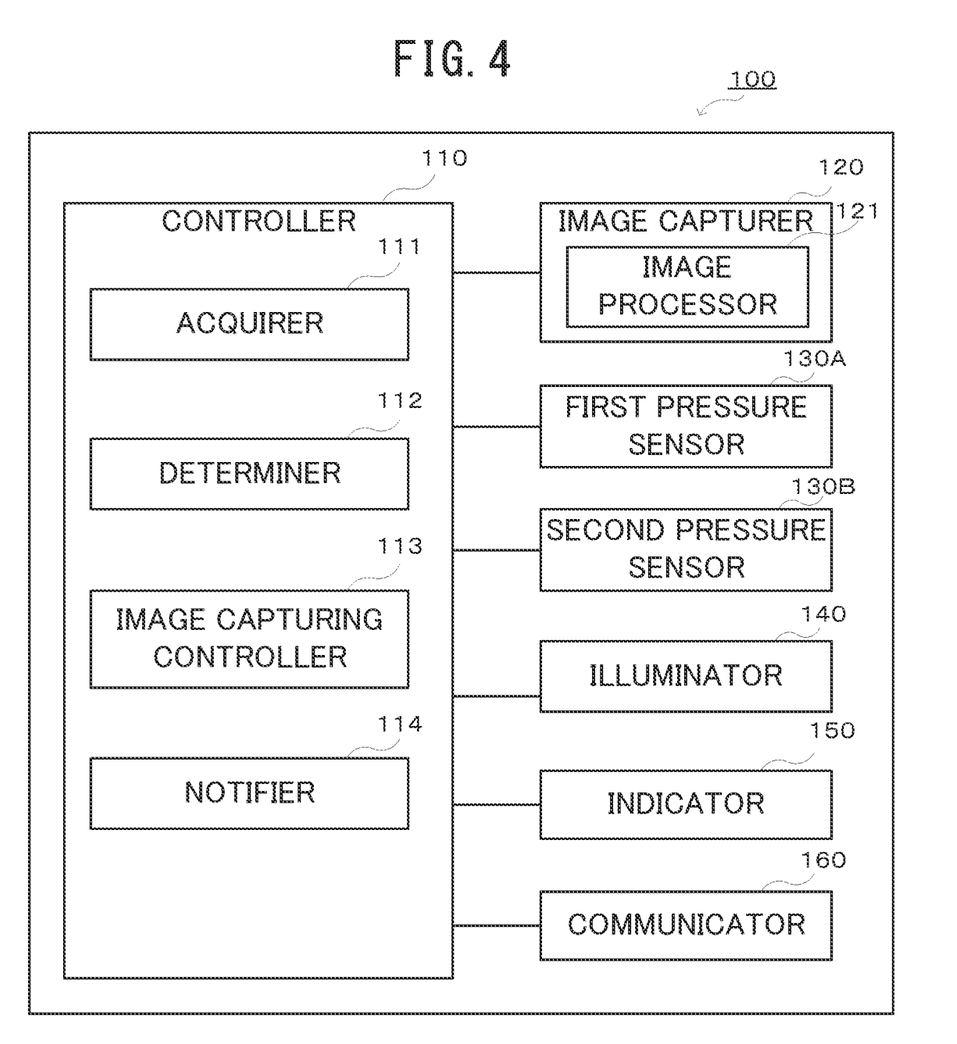
FIG. 4 is a block diagram illustrating a configuration of the image capturing device according to Embodiment 1 of the present disclosure.

As illustrated in FIG. 4, the image capturing device 100 includes, as electrical components, the controller 110 and a communicator 160, in addition to the aforementioned components, that is, the image capturer 120, the first and second pressure sensors 130A and 130B, the illuminator 140, and the indicator 150.

The controller 110 includes a central processing unit (CPU), a read only memory (ROM), a random access memory (RAM), and the like. The controller 110 functions as an acquirer 111, a determiner 112, an image capturing controller 113, and a notifier 114 by retrieving programs stored in the ROM and executing the retrieved programs in the RAM.

The acquirer 111 acquires the index indicating the strength at which the image capturing device 100 contacts the observation target R. The strength at which the image capturing device 100 contacts the observation target R means a strength of a force with which a user presses the image capturing device 100 against the observation target when placing the image capturing device 100 on the observation target R. The acquirer 111 acquires, as the index indicating such a strength of contact, a first pressure value measured by the first pressure sensor 130A and a second pressure value measured by the second pressure sensor 130B. The pressure values measured by the first and second pressure sensors 130A and 130B are zero when the image capturing device 100 does not contact the observation target R, and increase as the strength of contact increases.

The determiner 112 determines whether the index acquired by the acquirer 111 is equal to or greater than a predetermined reference. Moving the image capturing device 100 is not easy, with the image capturing device 100 pressed against the observation target R. Thus the determiner 112 functions as determination means for determining, by determining whether the index is equal to or greater than the predetermined reference, whether the image capturer 120 is in a first state in which the image capturer 120 is easily movable relative to the observation target R or in a second state in which the image capturer 120 is not easily movable relative to the observation target R. When the index acquired by the acquirer 111 is equal to or greater than the predetermined reference, the state corresponds to the second state in which the image capturer 120 is not easily movable relative to the observation target R. Specifically, the determiner 112 determines whether the first pressure value measured by the first pressure sensor 130A and the second pressure value measured by the second pressure sensor 130B are each equal to or greater than the reference. The user looks for an image capturing position while moving the image capturing device 100 without pressing against the observation target R, while looking at images captured by the image capturing device 100. When finding the image capturing position, the user presses the image capturing device 100 against the observation target R and captures an image of the observation target R. The predetermined reference is a value that enables determination of states as to whether the user looks for the image capturing position or whether the user observes the observation target R after looking for the image capturing position.

When the index acquired by the acquirer 111 is less than the predetermined reference, the image capturing controller 113 sets the image capturer 120 to capture an image in the first image capturing mode. When the index is equal to or greater than the predetermined reference, the image capturing controller 113 sets the image capturer 120 to capture an image in the second image capturing mode. The image capturing controller 113 acquires data indicating the image captured by the image capturer 120, and transmits the data indicating the image to the terminal device 200 via the communicator 160. Specifically, the image capturing controller 113 sets the image capturer 120 to capture an image in the first image capturing mode when a determination is made that at least one of the first pressure value measured by the first pressure sensor 130A or the second pressure value measured by the second pressure sensor 130B is less than the reference. The image capturing controller 113 sets the image capturer 120 to capture an image in the second image capturing mode when the first pressure value measured by the first pressure sensor 130A and the second pressure value measured by the second pressure sensor 130B are both equal to or greater than the reference.

When the image is being captured in the first image capturing mode, the notifier 114 lets the indicator 150 lit in yellow, and when the image is being captured in the second image capturing mode, the notifier 114 lets the indicator 150 lit in green. The user can know whether the image is being captured in the first image capturing mode or the second image capturing mode. When the image capturing device 100 is placed obliquely relative to the observation target R or when the force of pressing the image capturing device 100 against the observation target R is weak, at least one of the first pressure value or the second pressure value is less than the reference, and the image is captured in the first image capturing mode. The notifier 114 notifies the user of the image being captured in the first image capturing mode because of the weak pressing force or the oblique placement. The notifier 114 can thereby prompt the user to apply a stronger pressing force or to place the image capturing device 100 on the observation target R properly.

The communicator 160 transmits the data indicating the image to the terminal device 200. The communicator 160 includes a wireless communication module, such as a wireless local area network (LAN), Bluetooth (registered trademark), or the like.

Figure 5:
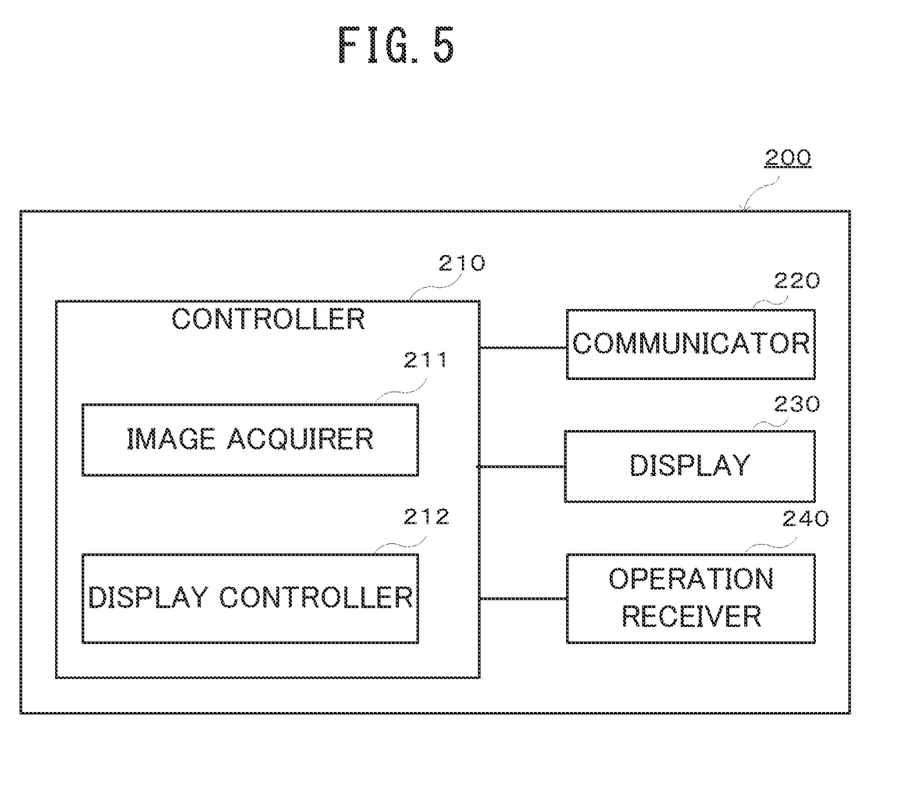
FIG. 5 is a block diagram illustrating a configuration of a terminal device according to Embodiment 1 of the present disclosure.

As illustrated in FIG. 5, the terminal device 200 includes a controller 210, a communicator 220, a display 230, and an operation receiver 240.

The controller 210 includes the CPU, the ROM, and the RAM. The controller 210 functions as an image acquirer 211 and a display controller 212 by retrieving programs store in the ROM and executing the retrieved programs in the RAM.

The image acquirer 211 acquires, via the communicator 220, the data indicating the image transmitted by the image capturing device 100, and stores the data in the RAM.

The display controller 212 displays, in the display 230, the image included in the data indicating the image acquired by the image acquirer 211.

The communicator 220 receives data indicating the image transmitted by the image capturing device 100. Similarly to the aforementioned communicator 160, the communicator 220 includes the wireless communication module such as the wireless LAN, Bluetooth (registered trademark), or the like.

The display 230 displays the captured image or an image necessary for manipulation, and includes a liquid crystal display (LCD).

The operation receiver 240 receives the start and stop of processing upon input of a user. The operation receiver 240 and the display 230 constitute a touch panel display device.

Next, an image capturing process executed by the image capturing device 100 is described for an example in which the data indicating the image captured by the image capturing device 100 having the aforementioned configuration is transmitted to the terminal device 200 and the captured image is displayed on the display 230 of the terminal device 200.

Figure 6:
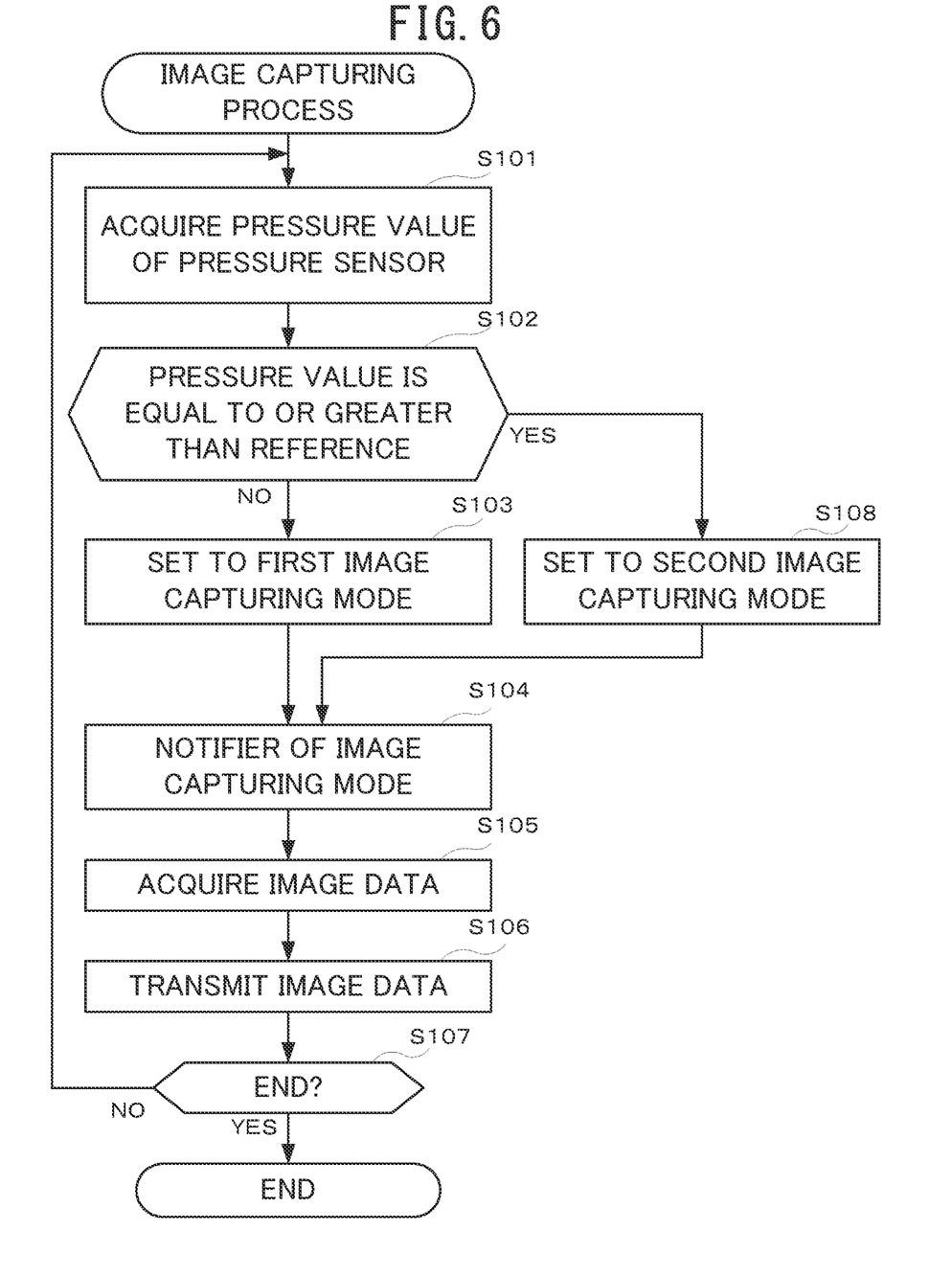
FIG. 6 is a flow chart illustrating an image capturing process executed by the image capturing device according to Embodiment 1 of the present disclosure.

The image capturing device 100 starts the image capturing process illustrated in FIG. 6, in response to an instruction to start the process provided by a user. The terminal device 200 receives the data indicating the image transmitted by the image capturing device 100 in response to the instruction to start the process provided by the user, and starts the process to display the image included in the received data indicating the image. The image capturing process executed by the image capturing device 100 is described using a flow chart.

Upon start of the image capturing process, the acquirer 111 acquires a first pressure value measured by the first pressure sensor 130A and a second pressure value measured by the second pressure sensor 130B (Step S101). Next, the determiner 112 determines whether the pressure value is equal to or greater than a reference (Step S102). Specifically, the determiner 112 determines whether the first pressure value measured by the first pressure sensor 130A and the second pressure value measured by the second pressure sensor 130B are each equal to or greater than the reference.

When a determination is made that the pressure value is less than the reference (No in Step S102), the image capturing controller 113 sets the image capturing mode of the image capturer 120 to the first image capturing mode (Step S103). Here, the determination that the pressure value is less than the reference includes a determination that at least one of the first pressure value measured by the first pressure sensor 130A or the second pressure value measured by the second pressure sensor 130B is less than the reference. The first image capturing mode has a frame rate higher than that of the second image capturing mode, and is a mode suitable for a case in which an image capturing position in the observation target R is looked for while the image capturing device 100 is moved. Next, the notifier 114 provides notification of an image capturing mode (Step S104). Specifically, the notifier 114 provides notification that the indicator 150 is lit in yellow and the image is being captured in the first image capturing mode.

When a determination is made that the pressure value is equal to or greater than the reference (Yes in Step S102), the image capturing controller 113 sets the image capturing mode of the image capturer 120 to the second image capturing mode (Step S108). Here, the determination that the pressure value is equal to or greater than the reference includes a determination that both of the first pressure value measured by the first pressure sensor 130A and the second pressure value measured by the second pressure sensor 130B are equal to or greater than the reference. Since the second image capturing mode has a resolution higher than that of the first image capturing mode, the image capturing device 100 can capture an image of the observation target R more definitely. Next, the notifier 114 provides notification of the image capturing mode (Step S104). Specifically, the notifier 114 provides notification that the indicator 150 is lit in green and the image is being captured in the second image capturing mode.

Next, the image capturing controller 113 acquires the data indicating the image captured by the image capturer 120 (Step S105). Then the image capturing controller 113 transmits the data indicating the image to the terminal device 200 via the communicator 160 (Step S106). The terminal device 200 having received the data indicating the image displays an image on the display 230. Next, a determination is made as to whether an end instruction is received (Step S107). When the end instruction is not accepted (No in Step S107), the process returns to Step S101, and Steps S101 to S108 are repeated. When the end instruction is accepted (Yes in Step S107), the image capturing process is completed.

As described above, the image capturing device 100 of the present embodiment, in a first state in which the image capturing device 100 is not pressed against the observation target R, can capture an image in the first image capturing mode for capturing at a high frame rate, and in a second state in which the image capturing device 100 is pressed against the observation target R, the image capturing device 100 can capture an image in the second image capturing mode for capturing at a high resolution. Thus even when a user tries to roughly locate an observation position while moving the image capturing device 100 greatly relative to the observation target R, the image capturing device 100 can capture an image at a high frame rate, thereby achieving a high responsivity of image acquisition, and can acquire a less-blur image even when the image capturing device 100 is moving. When the user presses the image capturing device 100 against the observation target R after locating the observation position, detailed image can be obtained since the image is captured in the second image capturing mode for capturing at a high resolution, which improves convenience to use. Since the image capturing mode is switched between the first image capturing mode for capturing at a high frame rate and the second image capturing mode for capturing at a low frame rate, the image capturing time at the first image capturing mode with a great amount of energy consumption is relatively short, which can result in a reduced amount of energy consumption. This can reduce battery exhaustion when the image capturing device 100 is a battery-driven portable device.

Embodiment 2

Figure 7:
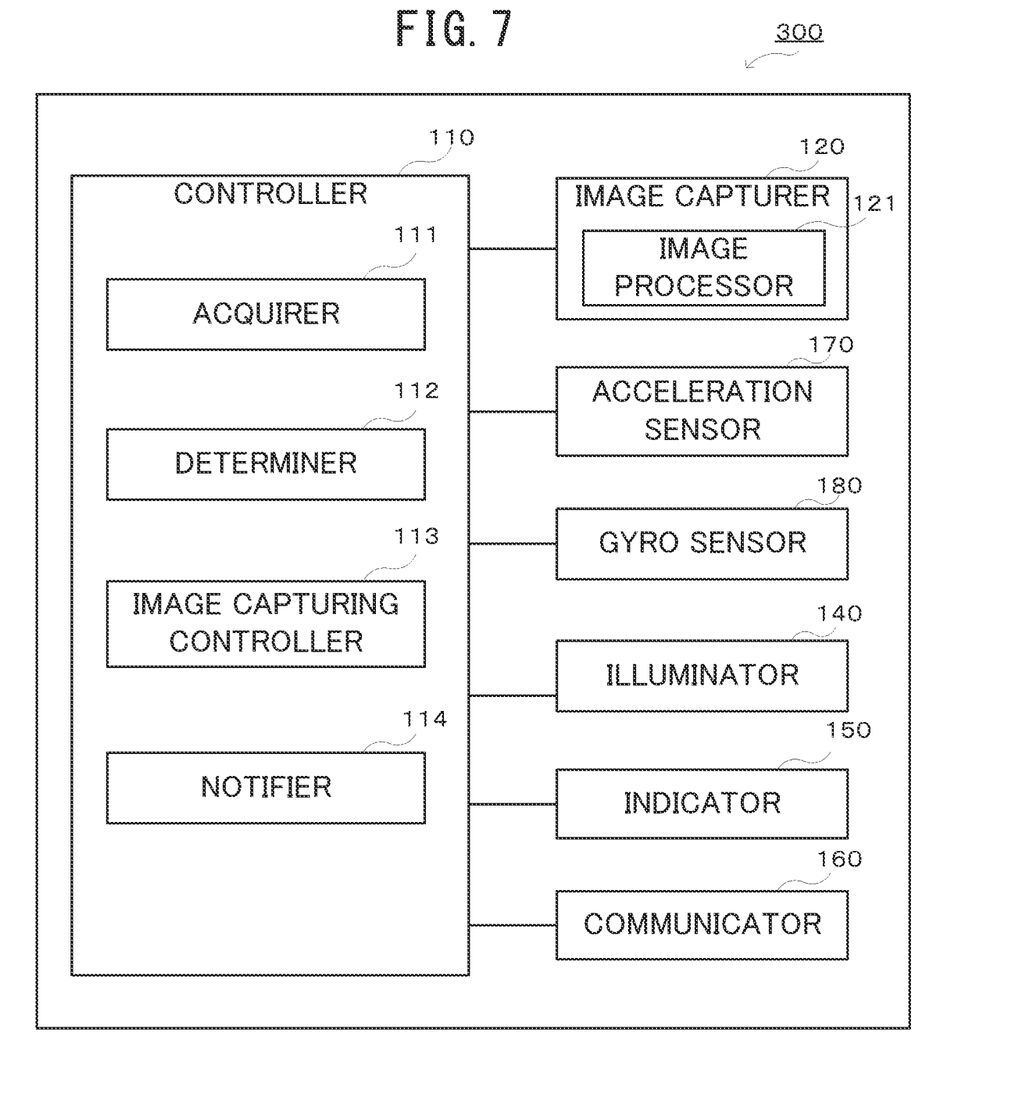
FIG. 7 is a block diagram illustrating a configuration of an image capturing device according to Embodiment 2 of the present disclosure.
Figure 8:
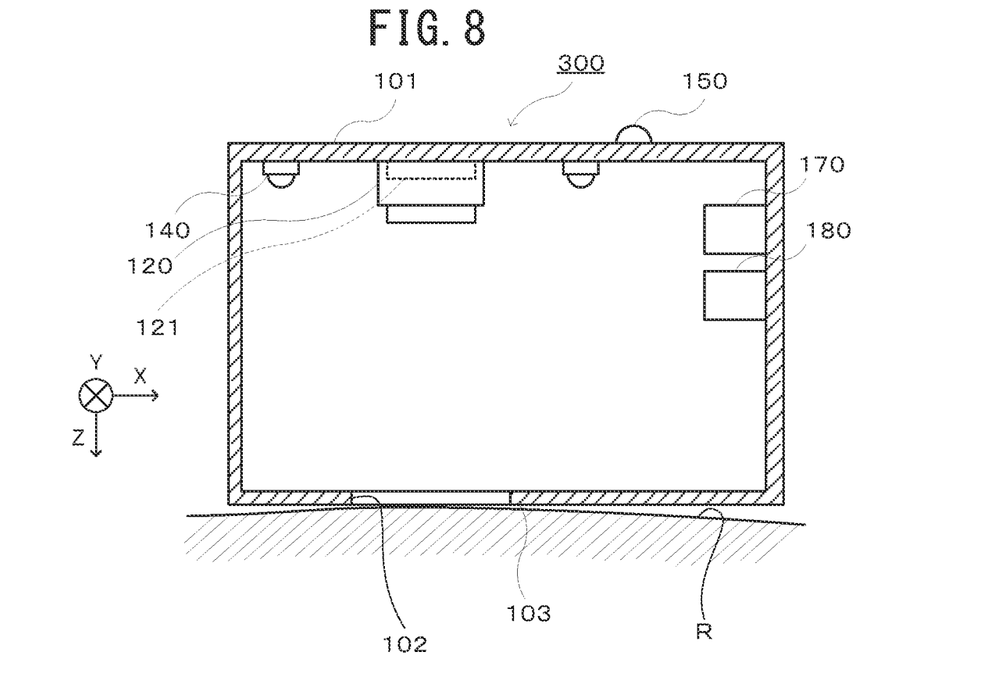
FIG. 8 is a cross-sectional view illustrating the image capturing device according to Embodiment 2 of the present disclosure.

An image capturing device 300 according to Embodiment 2 further includes an acceleration sensor 170 and a gyro sensor 180 as illustrated in FIGS. 7 and 8, instead of the first pressure sensor 130A and the second pressure sensor 130B included in the image capturing device 100 according to Embodiment 1. The other components are the same as those of Embodiment 1. The optical axis of the image capturer 120 is taken as the Z direction and the directions perpendicular to the optical axis are the X direction and the Y direction.

The acceleration sensor 170 is a sensor that measures acceleration in a well-known manner, such as a piezoresistive three-axis acceleration sensor, a capacitance three-axis acceleration sensor, a thermal three-axis acceleration sensor, or the like. The acceleration sensor 170 detects acceleration in the X-axis and Y-axis directions, converts the detected acceleration into an electrical signal, and outputs the electrical signal to the controller 110. In this way, the acceleration sensor 170 measures the acceleration that the image capturing device 300 experiences.

The gyro sensor 180 is a sensor that measures angular velocity in a well-known manner, such as a piezo-resistive gyro sensor, a capacitance gyro sensor, a piezoelectric gyro sensor, or the like. The gyro sensor 180 detects angular velocity in the X-axis and Y-axis directions, converts the detected angular velocity into an electrical signal, and outputs the electrical signal to the controller 110. In this way, the acceleration sensor 170 measures the angular velocity that the image capturing device 300 experiences.

The acquirer 111 acquires indexes indicating absolute values of the acceleration and the angular velocity of the image capturing device 300. The acceleration includes acceleration components in the X-axis, Y-axis, and Z-axis directions that the image capturing device 300 experiences. The angular velocity includes angular velocity components obtained by the image capturing device 300 rotating around the X-axis, Y-axis, and Z-axis directions. The value of the acceleration measured by the acceleration sensor 170 is zero, not considering the effect of acceleration of gravity, when the image capturing device 300 is stationary in the X-axis, Y-axis, and Z-axis directions, and the value of the acceleration is larger when a change in the velocity is greater. The value of the angular velocity measured by the gyro sensor 180 is zero when the image capturing device 300 does not rotate around each of the X-axis, Y-axis, and Z-axis directions, and the value of the angular velocity increases in accordance with the rotational speed when the image capturing device 300 rotates therearound.

The determiner 112 determines whether the index acquired by the acquirer 111 is less than the predetermined reference. The determiner 112 thus functions as determination means for determine whether the image capturer 120 is in a first state in which the image capturer 120 is moving relative to the observation target 4 or whether the image capturer 120 is in a second state in which the image capturer 120 does not move. When the index acquired by the acquirer 111 is less than the predetermined reference, the state corresponds to the second state in which the image capturer 120 does not move relative to the observation target R. Specifically, the determiner 112 determines whether the absolute value of the acceleration measured by the acceleration sensor 170 and the absolute value of the angular velocity measured by the gyro sensor 180 are each less than the reference. The user looks for an image capturing position while moving the image capturing device 300, looking at images captured by the image capturing device 300. While the user looks for the image capturing position while moving the image capturing device 300, the acceleration and the angular velocity increase. When finding the image capturing position, the user stops moving the image capturing device 300 and captures an image of the observation target R. The predetermined reference is a value that enables determination of states as to whether the user looks for the image capturing position or whether the user observes the observation target R after looking for the image capturing position.

When the index acquired by the acquirer 111 is greater than the predetermined reference, the image capturing controller 113 sets the image capturer 120 to capture an image in the first image capturing mode. When the index is equal to or less than the predetermined reference, the image capturing controller 113 sets the image capturer 120 to capture an image in the second image capturing mode. Specifically, the image capturing controller 113 sets the image capturer 120 to capture an image in the first image capturing mode when a determination is made that at least one of the absolute value of the acceleration measured by the acceleration sensor 170 or the absolute value of the angular velocity measured by the gyro sensor 180 is greater than the reference. The image capturing controller 113 sets the image capturer 120 to capture an image in the second image capturing mode when the absolute value of the acceleration measured by the acceleration sensor 170 and the absolute value of the angular velocity measured by the gyro sensor 180 are both equal to or less than the reference.

As described above, the image capturing device 300 of Embodiment 2, when the determination is made that one of the absolute values of the acceleration and the angular velocity is greater than the reference, can determine that the state is the first state in which the user is looking for the image capturing position and capture an image in the first image capturing mode for capturing at a high frame rate, and when the absolute values of the acceleration and the angular velocity are both equal to or less than the reference or when the state is the second state of no movement relative to the observation position, the image capturing device 300 can capture an image in the second image capturing mode for capturing at a high resolution. Thus even when a user tries to roughly locate an observation position while moving the image capturing device 300 greatly relative to the observation target R, the image capturing device 300 can capture an image at a high frame rate, thereby achieving a high responsivity of image acquisition, and can acquire a less-blur image even when the image capturing device 300 is moving greatly. When the user does not move the image capturing device 300 relative to the observation target R after locating the observation position, detailed image can be obtained since the image is captured in the second image capturing mode for capturing at a high resolution, which improves convenience to use. Since the image capturing mode is switched between the first image capturing mode for capturing at a high frame rate and the second image capturing mode for capturing at a low frame rate, the image capturing time at the first image capturing mode with a great amount of energy consumption is relatively short, which can result in a reduced amount of energy consumption. This can reduce battery exhaustion when the image capturing device 300 is a battery-driven portable device.

Variations

The aforementioned embodiments describe examples of image capturing by the image capturing devices 100 and 300 in the first image capturing mode for capturing at a low resolution and a high frame rate and in the second image capturing mode for capturing at a high resolution at a low frame rate. The frame rate in the first image capturing mode may be higher than that in the second image capturing mode, and the resolutions may be the same. Even in this case, since the image is captured at a low frame rate in the second image capturing mode, a time interval for image capturing per one frame is relatively long, noise is reduced, and detailed image can be obtained. Since the image capturing mode is switched between the first image capturing mode for capturing at a high frame rate and the second image capturing mode for capturing at a low frame rate, the image capturing time at the first image capturing mode with a great amount of energy consumption is relatively short, which can result in a reduced amount of energy consumption.

The aforementioned embodiments describe examples of image capturing by the image capturing devices 100 and 300 in the first image capturing mode and the second image capturing mode. The image capturing device 100 may capture an image in the third image capturing mode for capturing at a frame rate lower than the second image capturing mode, in addition to the first image capturing mode and the second image capturing mode. In this case, for example, the image capturing device 100 captures an image in the first image capturing mode when the pressure value is less than a first reference, captures an image in the second image capturing mode when the pressure value is equal to or less than the first reference and is less than a second reference higher than the first reference, and captures an image in the third image capturing mode when the pressure value is equal to or greater than the second reference. This can provide phased change of the frame rate and can acquire a less-blur image in accordance with movement of the image capturing device 100. The finely switching of the frame rate relatively shortens the image capturing time at the first image capturing mode with a great amount of energy consumption, which can result in a reduced amount of energy consumption. The image capturing device 100 may increase the frame rate steplessly as the pressure value increases. The image capturing device 300 may increase the frame rate steplessly as the absolute values of the acceleration and the angular velocity decrease.

The aforementioned embodiments describe examples of image capturing by the image capturing devices 100 and 300 in the first image capturing mode for capturing at a high frame rate and in the second image capturing mode for capturing at a low frame rate. The image capturing devices 100 and 300 may use the same frame rate and may capture an image at a low resolution in the first image capturing mode and at a high resolution in the second image capturing mode. Even in this case, detailed image can be obtained since the image is captured at a high resolution in the second image capturing mode that is higher than that in the first image capturing mode. Since the first image capturing mode uses sparse scanning, the first image capturing mode has an amount of energy consumption that is relatively smaller than that of the second image capturing mode. Since the image capturing mode is switched between the second image capturing mode and the first image capturing mode in which an amount of energy consumption is relatively small, the image capturing time at the second image capturing mode with a great amount of energy consumption is relatively short, which can result in a reduced amount of energy consumption.

Figure 9:
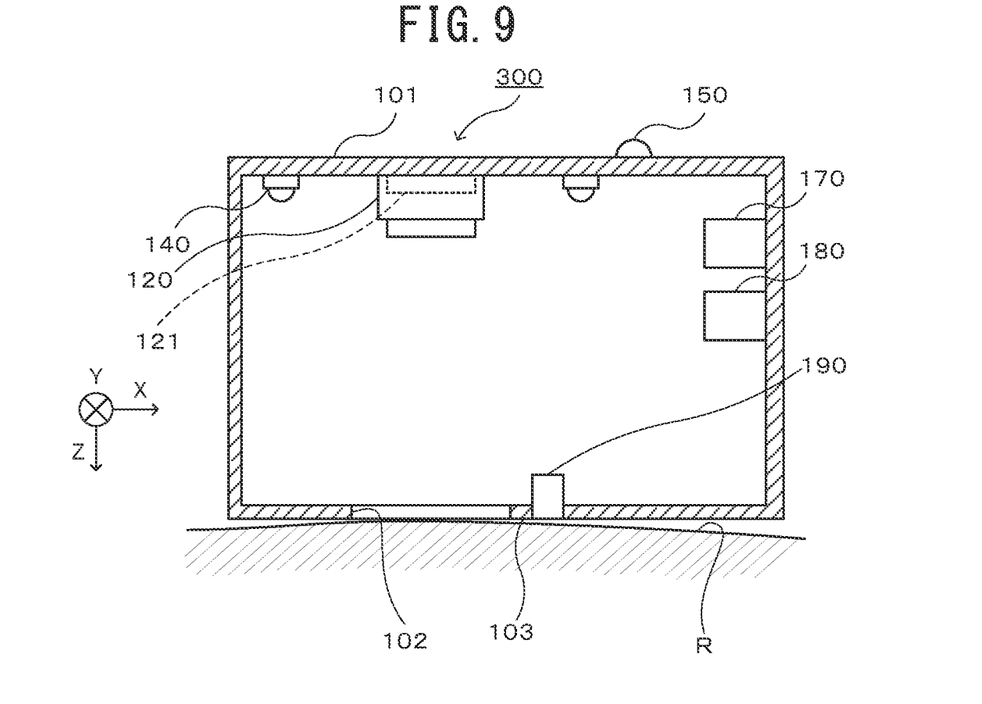
FIG. 9 is a cross-sectional view illustrating an image capturing device according to a variation of the present disclosure.

The aforementioned embodiments describe an example in which the image capturing device 300 includes the acceleration sensor 170 and the gyro sensor 180. The image capturing device 300 may a travel distance sensor 190 that detects an amount of movement relative to the observation target R, as illustrated in FIG. 9. The travel distance sensor 190 includes a light source, such as a LED or a laser diode (LD), and an optical sensor that detects light reflected on the observation target R. The travel distance sensor 190 detects an amount of movement of the image capturing device 300 relative to the observation target R in the X-axis and Y-axis directions. The travel distance sensor 190 is disposed at the abutment 103, and detects the travel distance by irradiating the observation target R with light from the light source to detect the light reflected on the observation target R with the optical sensor. In this case, when the travel distance per unit time is equal to or less than the reference, the determiner 112 determines that the image capturer 120 is in a state in which the image capturer 120 does not move relative to the observation target R. The image capturing device 300 may include at least any one of the acceleration sensor 170, the gyro sensor 180, or the travel distance sensor 190. Such inclusion of any one of the acceleration sensor 170, the gyro sensor 180, or the travel distance sensor 190 enables the determiner 112 to determine whether the image capturer 120 is in a state in which the image capturer 120 is moving relative to the observation target R.

Figure 10:
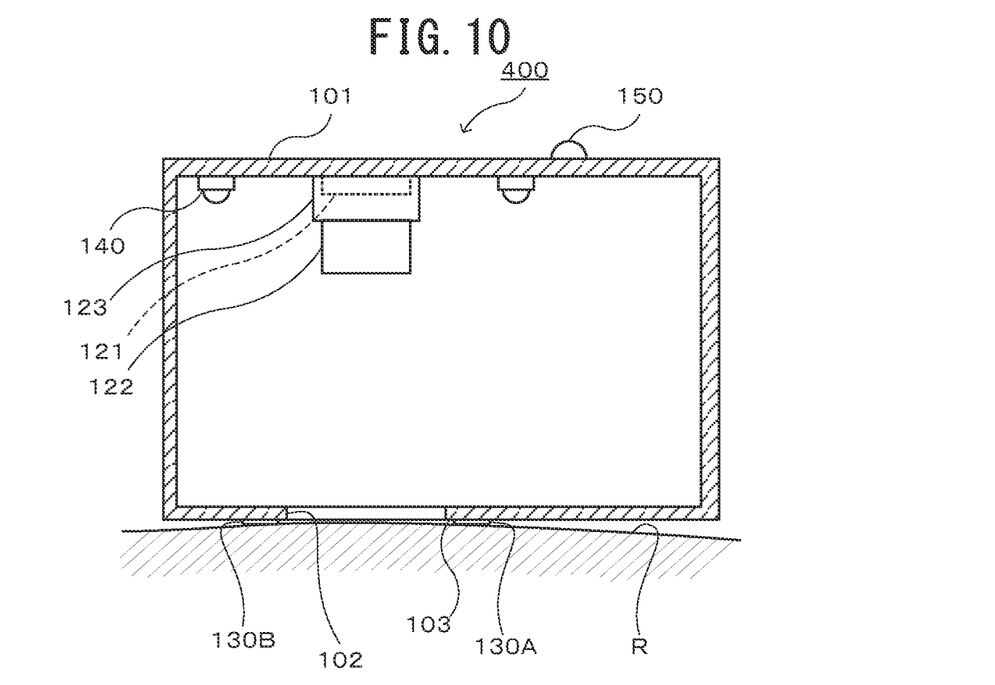
FIG. 10 is a cross-sectional view illustrating an image capturing device according to a variation of the present disclosure.

The aforementioned embodiments describe examples of image capturing by the image capturing devices 100 and 300 in the first image capturing mode for capturing at a high frame rate and in the second image capturing mode for capturing at a lower frame rate. It is sufficient that the image capturing devices 100 and 300 can capture a detailed image of the observation target R when the user does not move the image capturing devices 100 and 300 relative to the observation target R. For example, the image capturing device 400 may include an image capturer 123 that includes a zoom lens 122 as illustrated in FIG. 10. In this case, a magnification of the zoom lens 122 is set to a low level in the first image capturing mode, and is set to a high level in the second image capturing mode. For example, the magnification of the zoom lens 122 is set to 15 in the first image capturing mode, and is set to 30 in the second image capturing mode. Such settings provide image capturing at a low magnification when a user tries to roughly locate an observation position while moving the image capturing device 100 greatly relative to the observation target R, thereby enabling observation of an image with a wide coverage and easy finding of the observation position. A detailed image can be obtained since after the user locates the observation position, the image is captured in the second image capturing mode for capturing at a high magnification.

An image capturing device 400 may change the magnification of the image capturer 123 in a stepped manner of three or more steps or steplessly in accordance with an amount of movement of the image capturing device 400 relative to the observation target R This enables observation using the image with a low magnification and easy finding of the observation position when the user is moving the image capturing device 400 greatly relative to the observation target R. The smaller amount of movement, the magnification gradually increases, thereby enabling easy finding of the observation position.

The aforementioned embodiments describe a case that the image capturing device 100 includes the first pressure sensor 130A and the second pressure sensor 130B. The image capturing device 100 may include at least one pressure sensor, and may include three or more pressure sensors. With a single pressure sensor included, a measurement of the contact strength can be obtained. This can make the structure of the device simple. When three or more sensors are included, a more precise determination can be made as to whether the device is oriented properly.

The aforementioned embodiments describe an example in which the determiner 112 of the image capturing device 100 determines whether pressure values measured by the first and second pressure sensors 130A and 130B are equal to or more than the reference. The determiner 112 may determine, based on whether the pressure values measured by the first and second pressure sensors 130A and 130B are zero, whether the abutment 103 of the image capturing device 100 contacts the observation target R. In this case, the image capturing controller 113 sets the image capturer 120 to capture an image at the first image capturing mode when a determination is made that the abutment 103 does not contact the observation target R, and sets the image capturer 120 to set an image in the second image capturing mode when a determination is made that the abutment 103 contacts the observation target R. The determiner 112 may determine whether the abutment 103 of the image capturing device 100 contacts the observation target R, in addition to whether the pressure value is equal to or more than the reference. In this case, when a determination is made based on the determiner 112 that the abutment 103 of the image capturing device 100 does not contact the observation target R, the image capturing controller 113 stops power supply to the image capturer 120 or changes the mode of the image capturer 120 to a sleep mode. The sleep mode is a mode in which minimal power is supplied so as to achieve a swift transition to the image capturing mode again. When the user is not capturing an image of the observation target R, it is assumed that the user is to put the image capturing device 100, for example on a desk, to avoid contact between the abutment 103 of the image capturing device 100 and the observation target R. When the abutment 103 does not contact with the observation target R, it is assumed that the image capturing device 100 is not being used. Thus when the image capturing device 100 is not used, the power supply to the image capturer 120 is stopped or the mode of the image capturer 120 is changed to the sleep mode, which can result in a reduced amount of energy consumption.

Figure 11:
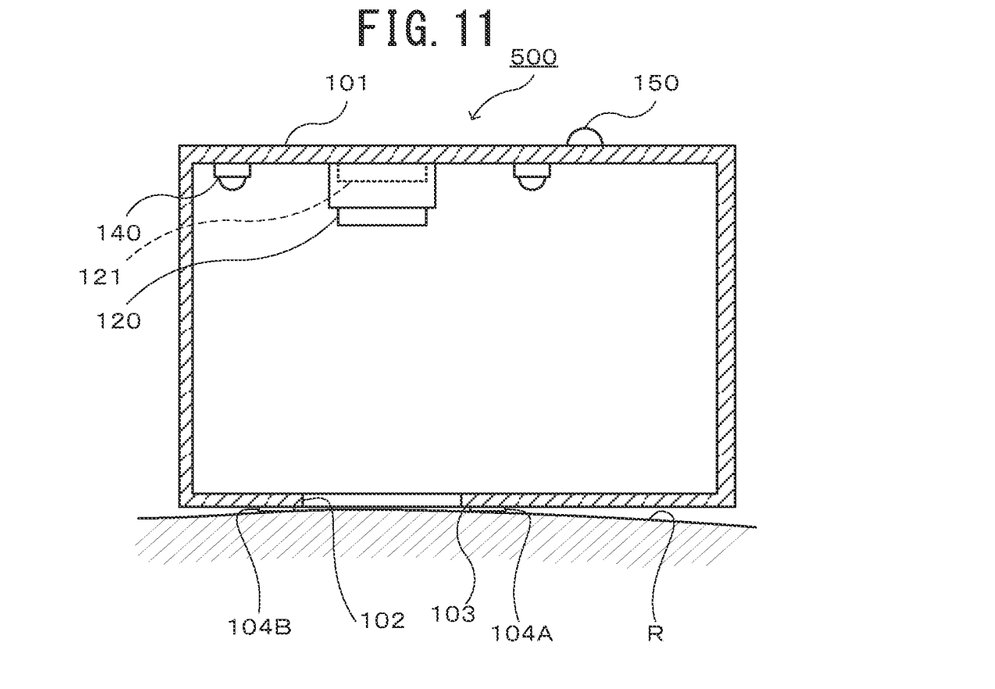
FIG. 11 is a cross-sectional view illustrating an image capturing device according to a variation of the present disclosure.

An image capturing device 500 may include first and second contact sensors 104A and 104B as illustrated in FIG. 11, instead of the first and second pressure sensors 130A and 130B. The first and second contact sensors 104A and 104B are sensors that detect, in a well-known manner such as capacitance type of method, whether contact occurs. In this case, the determiner 112 determines, by the first and second contact sensors 104A and 104B, whether the abutment 103 of the image capturing device 100 contacts the observation target R. The image capturing controller 113 sets the image capturer 120 to capture an image in the first image capturing mode when a determination is made that the abutment 103 does not contact the observation target R, and sets the image capturer 120 to capture an image in the second image capturing mode when a determination is made that the abutment 103 contacts the observation target R. The image capturing device 500 may include at least one contact sensor, and may include three or more contact sensors. With a single contact sensor included, a determination can be made that the contact occurs. This can make the structure of the device simple. When three or more contact sensors are included, a more precise determination can be made as to whether the device is oriented properly.

The aforementioned embodiments describe examples in which the image capturing devices 100, 300, 400, and 500 transmit data indicating the captured image to the terminal device 200, and the image is displayed on the terminal device 200. The image capturing devices 100, 300, 400, and 500 may include a display and display the image on the display.

A main part of the transmission and the image capturing process performed by the image capturing devices 100, 300, 400, and 500, and the terminal device 200, which include the CPU, the RAM, and the ROM, may be realized not by a dedicated system, but can be executed using a general personal digital assistant (a smartphone, a tablet personal computer (PC), etc.), a personal computer, or the like, without use of a dedicated system. For example, an information terminal that executes the aforementioned processes may be realized by storing a computer program for executing the aforementioned operations in a computer-readable recording medium, such as a flexible disc, a compact disc read only memory (CD-ROM), a digital versatile disc read only memory (DVD-ROM), for distribution and installing the computer program into the personal digital assistant or the like. An information processing device may be configured, for example, by the general personal digital assistant or the like downloading the computer program stored in a storage included in a server device on a communication network, such as the Internet.

For example, in a case in which the functions of the image capturing devices 100, 300, 400, and 500, and the terminal device 200 are shared by an operating system (OS) and an application program or performed in cooperation between the OS and the application program, just the application program of those may be stored in a recording medium or a storage device.

The computer program may be superimposed on a carrier wave, and then may be distributed via a communication network. For example, this computer program may be posted to a bulletin board system (BBS) on a communication network, and may be distributed via the network. Then the computer program may be started and executed under control of an OS in the same manner as other application programs to execute the aforementioned processes.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An image capturing device comprising:
   a camera configured to perform live preview image capturing of a skin surface at a predetermined frame rate while being moved relative to the skin surface;
   a sensor configured to detect, as a state of movement of the camera relative to the skin surface, a pressing force level at which an abutment is pressed against the skin surface, the abutment being to be pressed against the skin surface such that an optical path distance between the skin surface and an image capturing element is a predetermined distance; and
   a processor configured to, when the pressing force level detected by the sensor is lower than a predetermined threshold, (i) set a readout pixel number that is a number of pixels to be read in each frame to be lower than the readout pixel number in a case in which the pressing force level is higher than or equal to the threshold and (ii) set the frame rate to be higher than the frame rate in the case in which the pressing force level is higher than or equal to the threshold, wherein
   the processor sets the frame rate and the readout pixel number such that a value obtained by integrating the frame rate and the readout pixel number in the case in which the pressing force level is lower than the threshold is equal to a value obtained by integrating the frame rate and the readout pixel number in the case in which the pressing force level is higher than or equal to the threshold, thereby performing setting such that electric energy for drive of the camera in the case in which the pressing force level is higher than or equal to the threshold is lower than electric energy for drive of the camera in the case in which the pressing force level is lower than the threshold.

2. The image capturing device according to claim 1, wherein the processor sets the readout pixel number through (i) performing sparse scanning in the case in which the pressing force level is lower than the threshold and (ii) performing setting such that the sparse scanning is not performed in the case in which the pressing force level is higher than or equal to the threshold.

3. An image capturing method for an image capturing device including a camera configured to perform live preview image capturing of a skin surface at a predetermined frame rate while being moved relative to the skin surface, the method comprising:
   detecting, as a state of movement of the camera relative to the skin surface, a pressing force level at which an abutment is pressed against the skin surface, the abutment being to be pressed against the skin surface such that an optical path distance between the skin surface and an image capturing element is a predetermined distance; and
   when the detected pressing force level is lower than a predetermined threshold, (i) setting a readout pixel number that is a number of pixels to be read in each frame to be lower than the readout pixel number in a case in which the pressing force level is higher than or equal to the threshold and (ii) setting the frame rate to be higher than the frame rate in the case in which the pressing force level is higher than or equal to the threshold, wherein
   the frame rate and the readout pixel number are set such that a value obtained by integrating the frame rate and the readout pixel number in the case in which the pressing force level is lower than the threshold is equal to a value obtained by integrating the frame rate and the readout pixel number in the case in which the pressing force level is higher than or equal to the threshold, thereby performing setting such that electric energy for drive of the camera in the case in which the pressing force level is higher than or equal to the threshold is lower than electric energy for drive of the camera in the case in which the pressing force level is lower than the threshold.

4. A non-transitory computer-readable recording medium storing a program, the program causing a computer for control of a camera configured to perform live preview image capturing of a skin surface at a predetermined frame rate while being moved relative to the skin surface to function as:
   a sensor configured to detect, as a state of movement of the camera relative to the skin surface, a pressing force level at which an abutment is pressed against the skin surface, the abutment being to be pressed against the skin surface such that an optical path distance between the skin surface and an image capturing element is a predetermined distance; and
   a processor configured to, when the pressing force level detected by the sensor is lower than a predetermined threshold, (i) set a readout pixel number that is a number of pixels to be read in each frame to be lower than the readout pixel number in a case in which the pressing force level is higher than or equal to the threshold and (ii) set the frame rate to be higher than the frame rate in the case in which the pressing force level is higher than or equal to the threshold, wherein
   the processor sets the frame rate and the readout pixel number such that a value obtained by integrating the frame rate and the readout pixel number in the case in which the pressing force level is lower than the threshold is equal to a value obtained by integrating the frame rate and the readout pixel number in the case in which the pressing force level is higher than or equal to the threshold, thereby performing setting such that electric energy for drive of the camera in the case in which the pressing force level is higher than or equal to the threshold is lower than electric energy for drive of the camera in the case in which the pressing force level is lower than the threshold.

* * * * *